March 10, 1964
Z. SZOHATZKY
3,124,334
ROTATABLE BALL VALVE STRUCTURE WITH
A PARTICULAR STEM SEAL
Filed Sept. 15, 1961
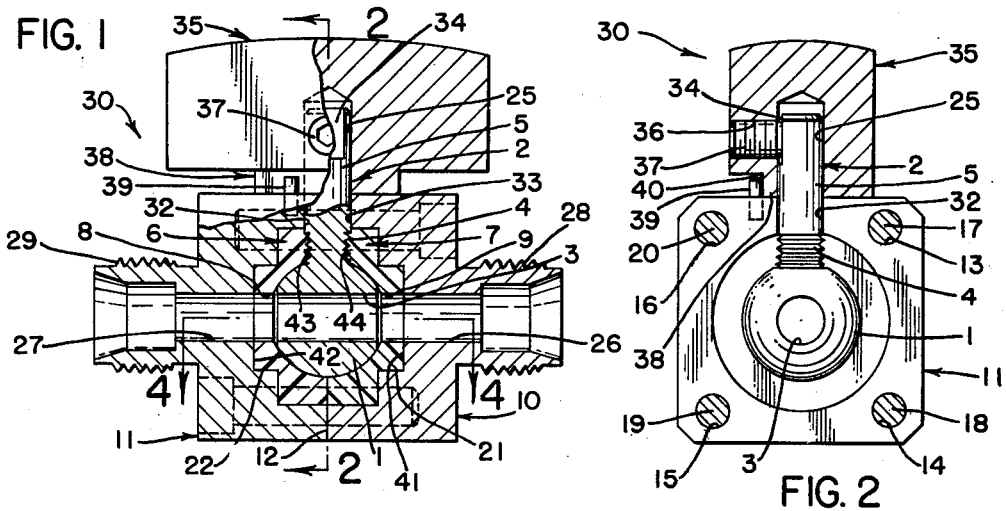
FIG. 1
FIG. 2
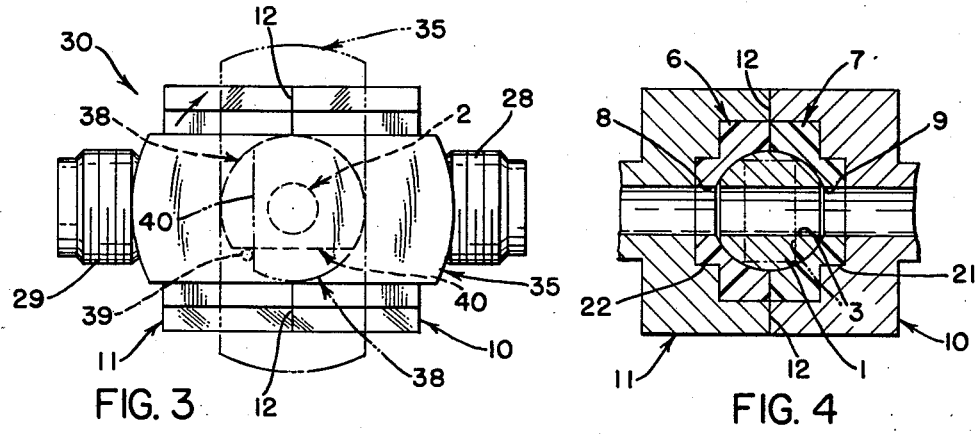
FIG. 3
FIG. 4
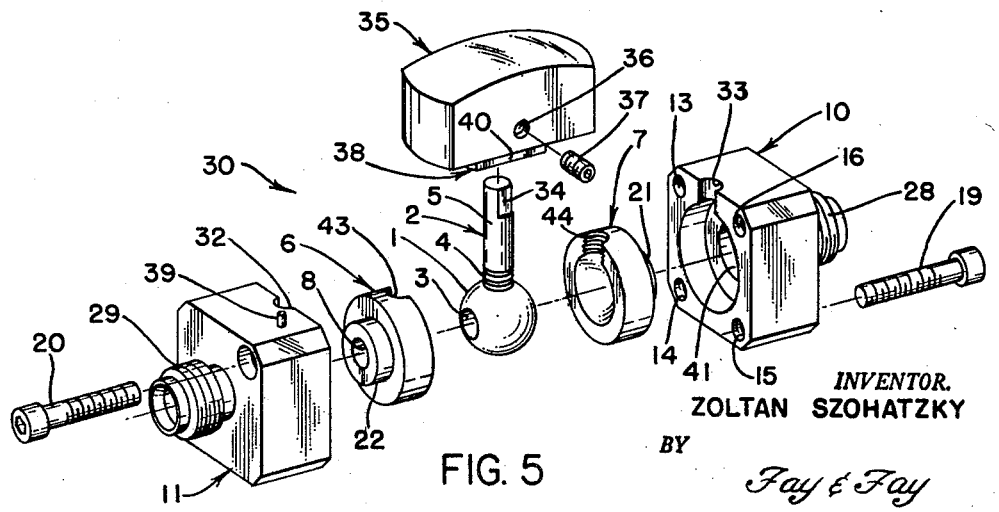
FIG. 5
INVENTOR.
ZOLTAN SZOHATZKY
BY
Fay & Fay
ATTORNEYS

United States Patent Office 3,124,334
Patented Mar. 10, 1964

3,124,334
ROTATABLE BALL VALVE STRUCTURE WITH
A PARTICULAR STEM SEAL
Zoltan Szohatzky, Cleveland, Ohio, assignor to Whitey
Research Tool Company, Oakland, Calif., a corporation of California
Filed Sept. 15, 1961, Ser. No. 138,413
14 Claims. (Cl. 251—214)

This invention concerns a valve structure having a rotatable plug and resilient seals and is particularly adapted for flow control applications requiring compact, leak-tight equipment. In its broadest sense, the device comprises a rotatable apertured plug and an integral grooved stem surrounded by apertured resilient sealing inserts held under compression between apertured valve housings. The compressed resilient sealing inserts of this novel structure maintain the rotatable valve plug and the grooved portion of the plug stem in leak-tight relation while providing a low friction seat for rotation of the plug and stem.

In a preferred embodiment of the invention, polytetrafluoroethylene is used for the resilient sealing inserts thereby providing a rotatable plug valve structure having a high wear resistance and chemical stability as well as a low friction plug seat and stem packing means.

A valve incorporating the principles of the invention is of compact overall size and includes tube fitting means integral with the valve casings. The apertures of the various components of this embodiment provide an uninterrupted and continuous flow path which prevents turbulent flow and pressure drop. Incorporated in this structure are suitable handle means for visual indication of the open and closed condition of the valve and stop means for limiting rotation of the valve plug. Ease of manufacture and maintenance of the valve are provided by the novel geometrical shape and symmetry of the various components.

A further advantage of the novel valve structure of this invention is its convertibility for use with electrical and air-operated actuating means.

Rotatable plug type valves having resilient sealing means are not new in themselves and many variations are known. The known valves of this type, however, have not provided adequately tight seals of simplified structure and ease of manufacture. Many such valves having complicated sealing arrangements and stem packings have been devised in an attempt to overcome this long-standing problem of the art. However, most of the prior art valves have resulted in compromises between efficient sealing and ease of assembly. Moreover, the structures of these prior art valves have produced undesirable turbulent flow and pressure drop due to irregular cavities and nonuniform passageways between the tube ends and the various components of the valve structure. The recent increase in high pressure applications requiring compact in-line mounting have amplified the need for a simpler and more compact valve having integral tube fitting means.

With the foregoing problems in mind, it is the general object of the invention to provide an improved valve device of great simplicity, efficiency and ease of manufacture for flow control applications.

It is a more specific object of the invention to provide a rotatable plug valve structure having resilient sealing inserts completely contained and under compression to insure leak-tightness and rigidity around the valve plug and activating stem.

It is a further object of the invention to provide a valve structure with an uninterrupted and continuous flow path of the same inside diameter as that of the tubes to which it is connected, thus minimizing pressure drop and turbulence.

It is a still further object of the invention to provide a valve structure of compact overall size, including integral tube connection means.

It is another and more specific object of the invention to provide a rotatable plug valve structure having a valve body and sealing means formed of symmetrical halves which may be manufactured and assembled easily and conveniently.

Other and more specific objects of the invention will become apparent from the detailed description to follow.

The invention comprises a valve having a rotatable plug with a passageway and integral stem means projecting from the periphery of the rotatable plug midway between the openings of the passageway, circular ridges and furrows on the stem means adjacent the plug, sealing inserts under compression intimately surrounding the plug and the ridges and furrows of the stem means, passageways in the inserts in register with the passageways of the plug, housings fixedly securing and intimately surrounding the inserts, passageways in the housings in register with the passageways of the inserts and the plug, and channels in the housings for receiving the stem means and exposing an end thereof, such that rotation of the exposed end of the stem means causes rotation of the plug relative to the inserts, thereby opening and closing the valve.

In the valve structure of the invention, the rotatable plug may be of spherical, conical, or cylindrical shape or any combination thereof capable of rotation. The passageways of the plug and the housings, preferably but not necessarily, are straight-through bores. The stem means of the valve structure preferably is mounted integrally with the plug to provide positive rotational movement of the plug. The sealing inserts of the valve structure seal both the rotatable plug and the integral stem means by substantially completely enveloping the plug and adjacent grooved portion of the stem means, thereby providing an easily assembled, leak-tight rotational seal. The sealing inserts are of a resilient plastic material, preferably polytetrafluoroethylene which has a low coefficient of friction and is relatively inert to most fluids and materials. The other components, preferably but not necessarily, are of stainless steel to minimize corrosion. In the assembled structure, the plastic material of the inserts flows into the grooves of the stem means under the forces of compression exerted by the surrounding housings, thereby forming a very efficient rotatable, high-pressure seal with the metal parts.

In the drawings:
FIG. 1 is a longitudinal section of the valve structure of the invention;
FIG. 2 is a view of the valve structure along the line 2—2 of FIG. 1, with the valve plug and stem elements shown in full;
FIG. 3 is a plan view of the valve structure illustrated in FIG. 1, showing the closed position of the handle in phantom;
FIG. 4 is a sectional view of the central portion of the valve structure taken along line 4—4 of FIG. 1; and
FIG. 5 is an exploded perspective view illustrating the shape and arrangement of the elements of the valve structure.

Referring now more particularly to the drawings where like numerals are used throughout for like parts in the several views:
In the illustrated preferred embodiment of the invention, the numeral 30 designates generally a valve structure embodying the principles of this invention and comprises in general a rotatable valve plug 1 of spherical shape having an integral stem 2 mounted on its periphery.

A bore or passageway 3 passes through the spherical plug with its axis perpendicular to the axis of the stem 2. A grooved, or ridged and furrowed portion 4 is provided on the stem 2 adjacent the spherical plug 1, and a smooth cylindrical surface 5 on the stem is separated from the spherical plug 1 by the grooved portion. Symmetrical polytetrafluoroethylene inserts 6 and 7 have passageways 8 and 9 in register with the passageway 3 of the plug 1, and surround the plug 1 and the grooved portion 4 of the stem 2. Symmetrical valve body casings or housings 10 and 11 surround the inserts 7 and 6 and urge them into intimate compressive relationship with the spherical plug 1 and the grooved portion 4 of the stem 2. The symmetrical inserts 7 and 6 and the symmetrical valve casings 10 and 11 are secured in face-to-face engagement along a plane 12 by threaded bores 13, 14, 15, and 16, and bolts 17, 18, 19, and 20 disposed therein. The inserts 6 and 7 are preferably, but not necessarily, of irregular external shape, such as illustrated by cylindrical bosses 21 and 22. The valve body casings 10 and 11 have an internal shape complementary to the external shape of the inserts 7 and 6 which include counterbores 41 and 42 to receive the cylindrical projections 21 and 22. The internal shape of the inserts 6 and 7 includes a spherical surface complementary to the spherical plug 1 and a ridged and furrowed portion 43 and 44 complementary to the portion 4 of the stem 2, thus forming a rotational seat for the plug 1 and integral stem means 2. The dimensions of the inserts 6 and 7 before being put under compression between the valve casings 10 and 11 are such that when compressed between the face-to-face casings 10 and 11 the passageways 8 and 9 are exactly in register with the passageway 3 of the spherical plug 1 and the grooves of the portion 4 of the stem are filled with the insert material. Similarly, insert passageways 9 and 8 are in register with the casing passageways 26 and 27 when the inserts are under compression.

Integral tube fitting means indicated generally by the numerals 28 and 29 are disposed on the valve body casings 10 and 11 in register with the passageways 26 and 27 thereof. These fitting extensions 28 and 29 are counterbored coaxially with the housing passageways 26 and 27 to provide for connection with tubing of a line. This arrangement provides an uninterrupted and continuous flow path from the lines to the valve, all of the passageways being of the same inside diameter as that of the line itself, minimizing pressure drop and turbulence and providing a compact overall size for the valve which makes "in-line" mounting feasible and practical.

The stem means 2 projects through a wall of the valve structure on the plane 12 by means of channels 32 and 33 in the casings 10 and 11. This structural arrangement provides a satisfactory support against inadvertent lateral movement of the valve stem 2 and undesirable displacement of the plug 1, which would be the result thereof. A flat portion 34 is provided on the exposed end of the stem 2 and telescoped thereon is a handle 35 with a stem receiving bore 25 and a threaded bore 36 for receipt of the set screw 37 which rigidly secures the handle relative to the stem. A projecting rib portion 38 on the side of the handle adjacent the valve body casings 10 and 11 bears on the surfaces of the casings adjacent the channels 33 and 32 to further rigidify the structure. The handle is of a generally rectangular shape and has its largest dimension in the direction of flow of the line when the valve is open, as illustrated in FIGS. 2 and 3, and has its longest dimension perpendicular to the direction of flow when the valve is closed, as illustrated in phantom in FIG. 3. A handle stop means 39 is provided on either one of the casings 10 or 11, in a position to cooperate with the rib 38 of the handle. The handle is limited to rotation through 90 degrees to a single open and closed position by the shape of the rib 38 as illustrated in FIG. 3. The outer surface of the rib is generally cylindrical with a flat surface 40 which remains tangent to the stop 39 through 90 degrees of rotation. An alternative means of limiting rotation, not shown, is the provision of projections on the rib 38 disposed at points 90 degrees around the periphery for engagement with the stop means 39.

The valve structure may be converted for use with conventional electrical or air operated actuating means by substituting a suitable lever for the handle on the exposed end of the stem 2.

As used in the description of this invention, the term "rotatable plug" describes any element of a shape which may be rotated about the axis of stem 2. The preferred shape is, as illustrated, a sphere in that such a surface gives a positive seating arrangement of greater surface area and provides a large effective sealing area. The passageway 3 of the rotatable plug, and the passageways 8 and 9 of the inserts 6 and 7 are preferably of circular cross-sectional shape, as are the passageways of the casing components, to provide a valve structure with an uninterrupted and continuous flow path of the same inside shape and diameter as that of the tube to which it is connected, thus minimizing pressure drop and turbulence. This relationship is maintained even in high pressure applications of the valve structure because of the constant compressive forces on the inserts 7 and 6 when in their assembled relation between the plug 1 and the casings 10 and 11.

The inclusion of the integral tube fitting means 28 and 29 on the casings 10 and 11 makes possible a compact overall size. For example, for a one-fourth inch tubing line, a valve structure 2⅜ inches long by 1½ inches high is possible even with the integral tube fitting means.

The valve structure illustrated is manufactured and assembled easily and conveniently because the valve body and valve sealing elements are formed of symmetrical halves easily finished by common machining techniques. This symmetrical arrangement of components permits a reduced inventory of replacement parts for maintenance of the valve. The simplified shape also facilitates conversion of the valve structure for mounting in panels of varying thicknesses and for mounting conventional electrical or air control means. Further, the structure permits manual use with control switches and control lights to indicate the open and closed condition of the valve.

For ease of description, the principles of the invention have been set forth in detail in connection with but a single illustrated embodiment. It is not my intention that the illustrated embodiment nor the terminology employed in describing the invention be limiting inasmuch as variations in these may be made without departing from the spirit of the invention. Rather, I desire to be restricted only by the scope of the appended claims.

What is claimed is:

1. A valve comprising a rotatable plug having a passageway, integral stem means projecting from the periphery of said rotatable plug, circular grooves on said stem means adjacent said plug, sealing inserts under compression intimately surrounding said plug and the grooves of said stem means, passageways in said inserts communicating with the passageway of said plug, housings fixedly securing and intimately surrounding said inserts, passageways in said housings communicating with the passageways of said inserts, and channels in said housings for receiving said stem means and exposing an end thereof, whereby upon rotation of said exposed end of said stem means said plug is rotated relative to said inserts thereby opening and closing said valve.

2. The structure of claim 1 in which a handle visually indicating the position of the plug passageway is disposed on the exposed end of the stem means.

3. The structure of claim 2 in which the handle bears on the surface of said housings adjacent said stem.

4. The structure of claim 3 in which the handle is limited to 90 degrees of rotation by a stop means.

5. A valve comprising a sphere having a passageway, integral stem means projecting from the periphery of said sphere midway between the openings of said passageway, circular ridges and furrows on said stem means adjacent said sphere, polytetrafluoroethylene sealing inserts under compression intimately surrounding said sphere and the ridges and furrows of said stem means, passageways in said inserts in register with the passageways of said sphere, housings fixedly securing said intimately surrounding said inserts, passageways in said housings in register with the passageways of said inserts and said sphere, and channels in said housings for receiving said stem means and exposing an end thereof whereby upon rotation of said exposed end of said stem means said sphere is rotated relative to said inserts thereby opening and closing said valve.

6. In a valve structure having a rotatable plug and a passageway therethrough, the improvement comprising an integral stem projecting from the periphery of said plug, circular grooves on said stem adjacent said plug, plastic inserts arranged in sealing face-to-face engagement surrounding said grooves and said plug, said inserts having passageways communicating with the passageway of said plug, valve body casings surrounding and maintaining said inserts under compression, said casings having passageways communicating with the passageways of said inserts and channels for receiving said stem, means securing said casing members in face-to-face engagement whereby said plug and stem may be rotated in said inserts to open and close said passageway.

7. A rotatable plug valve structure of claim 6 in which a handle visually indicating the position of the plug passageway is disposed on the exposed end of the stem means.

8. The structure of claim 7 in which the handle bears on the surface of said housings adjacent said stem.

9. The structure of claim 8 in which the handle is limited to 90 degrees of rotation by a single stop means which engages the handle at both limits of rotation.

10. The structure of claim 6 in which the valve body casings and the plastic inserts are symmetrical.

11. The structure of claim 10 in which the valve body casings include integral tube fitting means.

12. In a valve structure having a ball and a passageway therethrough, the improvement comprising an integral stem projecting from the periphery of said ball with its axis at right angles to the passageway, circular grooves on said stem adjacent said ball, symmetrical polytetrafluoroethylene inserts arranged in sealing face-to-face engagement surrounding said grooves and said ball, said inserts having passageways in register with the passageway of said ball, symmetrical valve body casings surrounding and maintaining said inserts under compression, said casings having passageways in register with the passageways of said inserts and channels for receiving said stem, means securing said casing members in face-to-face engagement whereby said ball and stem may be rotated within said inserts to open and close said passageway.

13. The structure of claim 12 in which the inserts have cylindrical projections thereon, and the surfaces of said valve body casings adjacent said inserts are complementary to the surfaces of said inserts.

14. A ball valve for connection with a conduit comprising a two-member casing, each of said casing members having a face secured in contact and register with an identical face of the other member, each of said faces having a cavity therein and a semicylindrical channel communicating said cavity with an adjacent outer surface of its respective casing member, each of said casing members having a projecting extension on the outer surface opposite its face, each of said projecting extensions having a fluid-conducting bore in communication with its respective cavity and in register with the bore of the other member, each of said bores having a counterbore at its inner end, each of said casing members having a polytetrafluoroethylene insert in its respective cavity and counterbore, each of said inserts mounted under compression flush with its respective face and having a fluid-conducting bore in register with the fluid-conducting bore of the casing members, each of said plastic inserts having a semi-spherical cavity at the inner end of its bore in register with a like cavity in the other insert and defining a chamber therewith, a spherical plug rotatably disposed in the chamber defined by said inserts, a fluid-conducting bore in said plug in register with the fluid-conducting bores of said inserts and said casing members, an integral stem member connected to said plug on the periphery thereof midway between the openings of said bore, said stem having a plurality of circular grooves disposed around its periphery adjacent said plug, the portion of said stem member having said grooves being disposed in the channel of said inserts, each of said inserts having grooves in its respective channel complementary to the grooves of said stem whereby the plug and its integral stem may rotate within the chamber and channels of said compressed inserts, a handle rigidly affixed to the outer end of said stem and bearing on the surfaces of said casing members adjacent the channels of said members, said handle being of a shape to indicate visibly the position of the bore of the plug in relation to the position of the bores of the inserts and casing members to limit rotation of the handle, and securing means maintaining said elements in their operative relation.

References Cited in the file of this patent

UNITED STATES PATENTS

| 1,043,065 | Cash | Nov. 5, 1912 |
| 2,905,197 | Janes | Sept. 22, 1959 |
| 2,987,295 | Schenck | June 6, 1961 |

FOREIGN PATENTS

| 1,045,390 | France | June 24, 1953 |